United States Patent
Happy et al.

(10) Patent No.: US 9,403,491 B2
(45) Date of Patent: Aug. 2, 2016

(54) VEHICLE CAMERA ASSEMBLY

(71) Applicant: Nissan North America, Inc., Franklin, TN (US)

(72) Inventors: Kyle Happy, Walled Lake, MI (US); Kenneth Bowers, Romeo, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/471,824

(22) Filed: Aug. 28, 2014

(65) Prior Publication Data

US 2016/0065796 A1     Mar. 3, 2016

(51) Int. Cl.
| | |
|---|---|
| *H04N 5/225* | (2006.01) |
| *B60R 11/04* | (2006.01) |
| *B60R 1/10* | (2006.01) |
| *B60R 1/00* | (2006.01) |
| *B60R 1/02* | (2006.01) |
| *B60R 11/00* | (2006.01) |

(52) U.S. Cl.
CPC ............... *B60R 11/04* (2013.01); *B60R 1/002* (2013.01); *B60R 1/006* (2013.01); *B60R 1/02* (2013.01); *B60R 1/10* (2013.01); *H04N 5/225* (2013.01); *B60R 1/00* (2013.01); *B60R 2011/004* (2013.01); *B60R 2011/0082* (2013.01); *B60R 2011/0084* (2013.01); *B60R 2011/0085* (2013.01); *B60R 2011/0092* (2013.01); *B60R 2300/607* (2013.01); *B60R 2300/8046* (2013.01)

(58) Field of Classification Search
None
See application file for complete search history.

(56) References Cited

U.S. PATENT DOCUMENTS

| | | | |
|---|---|---|---|
| 7,287,867 B2 | 10/2007 | Wellington et al. | |
| 7,825,951 B2 | 11/2010 | Lang et al. | |
| 8,144,033 B2 | 3/2012 | Chinomi et al. | |
| 8,243,994 B2 | 8/2012 | Suzuki et al. | |
| 8,545,071 B2 | 10/2013 | Uematsu et al. | |
| 2003/0137586 A1* | 7/2003 | Lewellen ............... | H04N 7/181 348/148 |
| 2004/0121820 A1 | 6/2004 | Unno et al. | |
| 2006/0171704 A1* | 8/2006 | Bingle .................... | B60R 11/04 396/419 |
| 2008/0055411 A1* | 3/2008 | Lee ......................... | B60R 1/00 348/148 |
| 2009/0231430 A1* | 9/2009 | Buschmann ........ | B60Q 1/0023 348/148 |
| 2010/0066833 A1* | 3/2010 | Ohshima ................ | B60R 1/00 348/148 |
| 2010/0231715 A1* | 9/2010 | Garner .................... | B60R 1/00 348/148 |
| 2010/0238051 A1 | 9/2010 | Suzuki et al. | |
| 2011/0181728 A1* | 7/2011 | Tieman .................. | B60R 1/00 348/148 |
| 2012/0069182 A1 | 3/2012 | Sumi et al. | |
| 2012/0133768 A1* | 5/2012 | Stephan ................. | B60R 1/00 348/148 |

(Continued)

FOREIGN PATENT DOCUMENTS

| | | |
|---|---|---|
| EP | 0945305 B1 | 1/2003 |
| JP | 2008-049783 A | 3/2008 |
| JP | 2010-012865 A | 1/2010 |

*Primary Examiner* — Justin P Misleh
(74) *Attorney, Agent, or Firm* — Global IP Counselors, LLP

(57) ABSTRACT

A vehicle includes a vehicle body structure and a video camera assembly. The video camera assembly includes a base member, a video camera, a video display and an image processor. The base member is fixedly mounted to a side surface of the vehicle. The video camera is moveably supported to the base member for movement between a retracted orientation adjacent to the side surface and an extended orientation extended outward away from the side surface to capture a video image of an area outside the vehicle. The video display is supported within the vehicle such that the video display is visible within a passenger compartment of the vehicle. The image processor is operatively coupled to the video camera and the video display to process the video image captured by the video camera and to stream a video view to the video display.

13 Claims, 8 Drawing Sheets

(56) References Cited

U.S. PATENT DOCUMENTS

| | | | |
|---|---|---|---|
| 2012/0293656 A1* | 11/2012 | Schutz | B60R 11/04 348/148 |
| 2013/0016219 A1* | 1/2013 | Hahner | B60R 11/04 348/148 |
| 2014/0063233 A1* | 3/2014 | Henion | B60R 1/003 348/118 |
| 2014/0063245 A1* | 3/2014 | Bowers | B60R 1/0607 348/148 |
| 2014/0092495 A1 | 4/2014 | Bowers et al. | |
| 2014/0327775 A1* | 11/2014 | Cho | H04N 5/23216 348/148 |
| 2014/0376119 A1* | 12/2014 | Sobecki | B60R 1/074 359/841 |
| 2015/0175088 A1* | 6/2015 | Chang | B60R 11/04 348/148 |

* cited by examiner

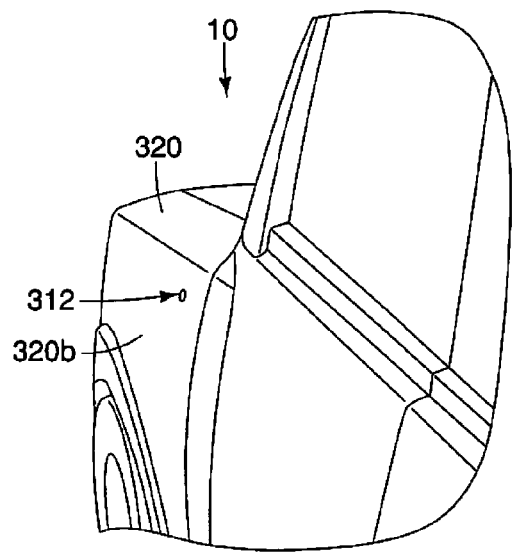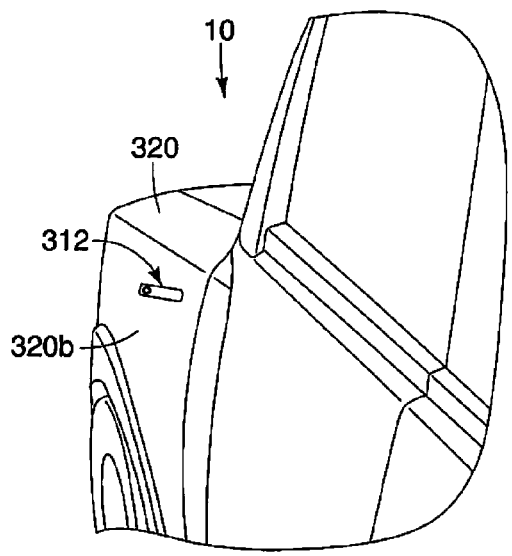
FIG. 16  FIG. 17
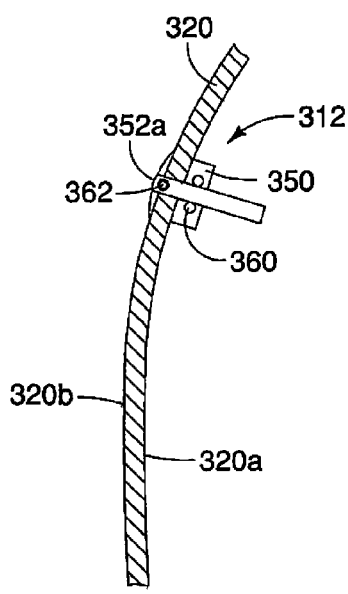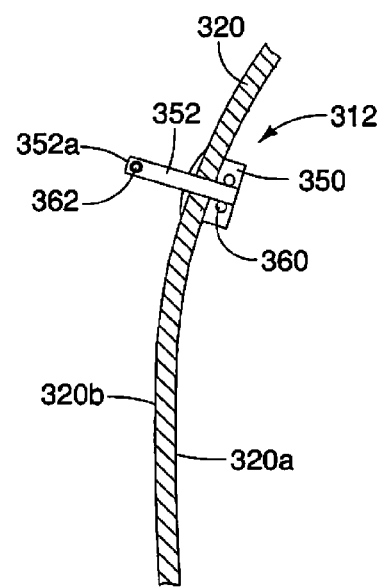
FIG. 18  FIG. 19

VEHICLE CAMERA ASSEMBLY

BACKGROUND

1. Field of the Invention

The present invention generally relates to a vehicle camera assembly. More specifically, the present invention relates to a vehicle camera assembly that provides images of areas outside the vehicle.

2. Background Information

Side rear view mirrors are required in many countries on motorized vehicles. Side rear view mirrors typically extend laterally from a side surface of a door of the motorized vehicle and are aimed so that the vehicle operator can look in each mirror and see reflections of areas to the side and rear of the vehicle. Side rear view mirrors have become larger in recent years in order to provide greater side and rear visibility. However, larger side rear view mirrors adversely affect the aerodynamics of the vehicle and can have an adverse effect on fuel economy.

SUMMARY

One object of the disclosure is to provide a vehicle with a low wind resistance alternative to large side rear view mirrors.

Another object of the disclosure is to provide a vehicle with side rear view cameras that are moveable between a retracted orientation and an extended orientation.

In view of the state of the known technology, one aspect of the disclosure is a vehicle that includes a vehicle body structure, a base member, a video camera, a video display and an image processor. The vehicle body structure defines a side facing surface outside the vehicle body structure and a passenger compartment within the vehicle body structure. The base member is fixedly mounted to the side facing surface. The video camera is moveably supported to the base member for linear movement between a retracted orientation adjacent to the side facing surface and an extended orientation moved outward away from the side facing surface to capture a video image of an area outside the vehicle body structure. The video display is supported to the vehicle body structure such that the video display is visible within the passenger compartment. The image processor is operatively coupled to the video camera and the video display to process the video image captured by the video camera and to stream a video view to the video display.

BRIEF DESCRIPTION OF THE DRAWINGS

Referring now to the attached drawings which form a part of this original disclosure:

FIG. 16 is a perspective view of a driver's side of a vehicle body structure showing a video camera assembly mounted to a front fender with the video camera assembly in a retracted orientation in accordance with a fifth embodiment;

FIG. 17 is another perspective view similar to FIG. 16 showing the video camera assembly in an extended orientation in accordance with the fifth embodiment;

FIG. 18 is a cross-sectional view of the fender depicted in FIGS. 16 and 17 showing details of the video camera assembly in the retracted orientation in accordance with the fifth embodiment; and FIG. 19 is another cross-sectional view similar to FIG. 18 showing the video camera assembly in the extended orientation in accordance with the fifth embodiment.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
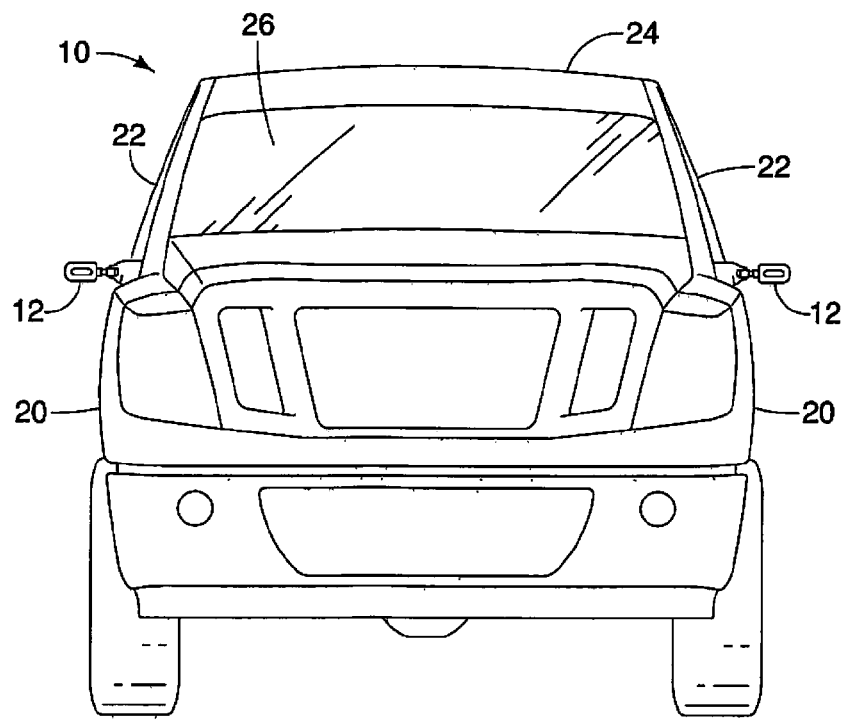
FIG. 1 is a front view of a vehicle having a vehicle body structure with side surfaces, the vehicle including a pair of video camera assemblies installed to opposite side surfaces of the vehicle, with the video camera assemblies being in respective retracted orientations in accordance with a first embodiment.

Referring initially to FIG. 1, a vehicle 10 that includes video camera assemblies 12 is illustrated in accordance with a first embodiment. The video camera assemblies 12 are configured to provide images of areas to the side and rear of the vehicle 10 to a vehicle operator and are configured to replace conventional rear view side mirrors, as described in greater detail below. As shown in FIG. 1, there is one video camera assembly 12 mounted to a passenger's side of the vehicle 10 and another video camera assembly 12 mounted to a driver's side of the vehicle 10. The video camera assemblies 12 are described in greater detail below.

Figure 2:
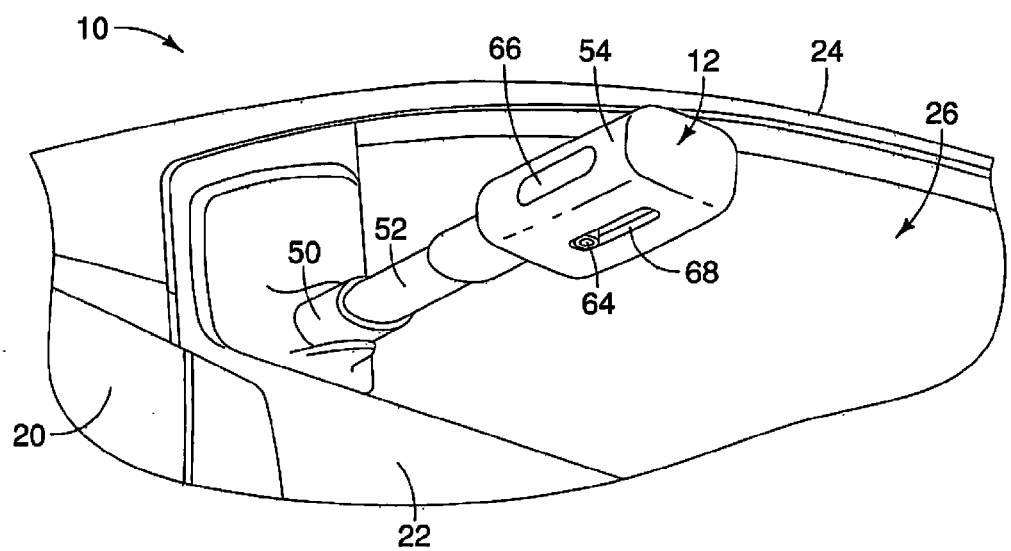
FIG. 2 is a perspective view of a portion of one of the side surfaces of the vehicle showing one of the video camera assemblies with the video camera assembly in an extended orientation in accordance with the first embodiment.

The vehicle 10 has a body structure that basically includes many conventional components such as fenders 20, doors 22 and a roof structure 24, as shown in FIGS. 1 and 2. As shown schematically in FIG. 3, the body structure of the vehicle 10 includes a passenger compartment 26 with a steering column 28, an instrument panel 30 and a rear view mirror M. The instrument panel 30 includes a video display 32, an optional side video display 32a and a plurality of conventional features whose description is omitted for the sake of brevity. The video display 32 is supported to a central area of the instrument panel 30 such that the video display 32 is visible to a vehicle operator seated behind the steering column 28 within the passenger compartment 26. The optional side video display 32a is mounted above the instrument panel forward of the door 22 and at a level where the vehicle operator can easily glance at it, as described in greater detail below. The function of the video display 32 is described in greater detail below.

Figure 3:
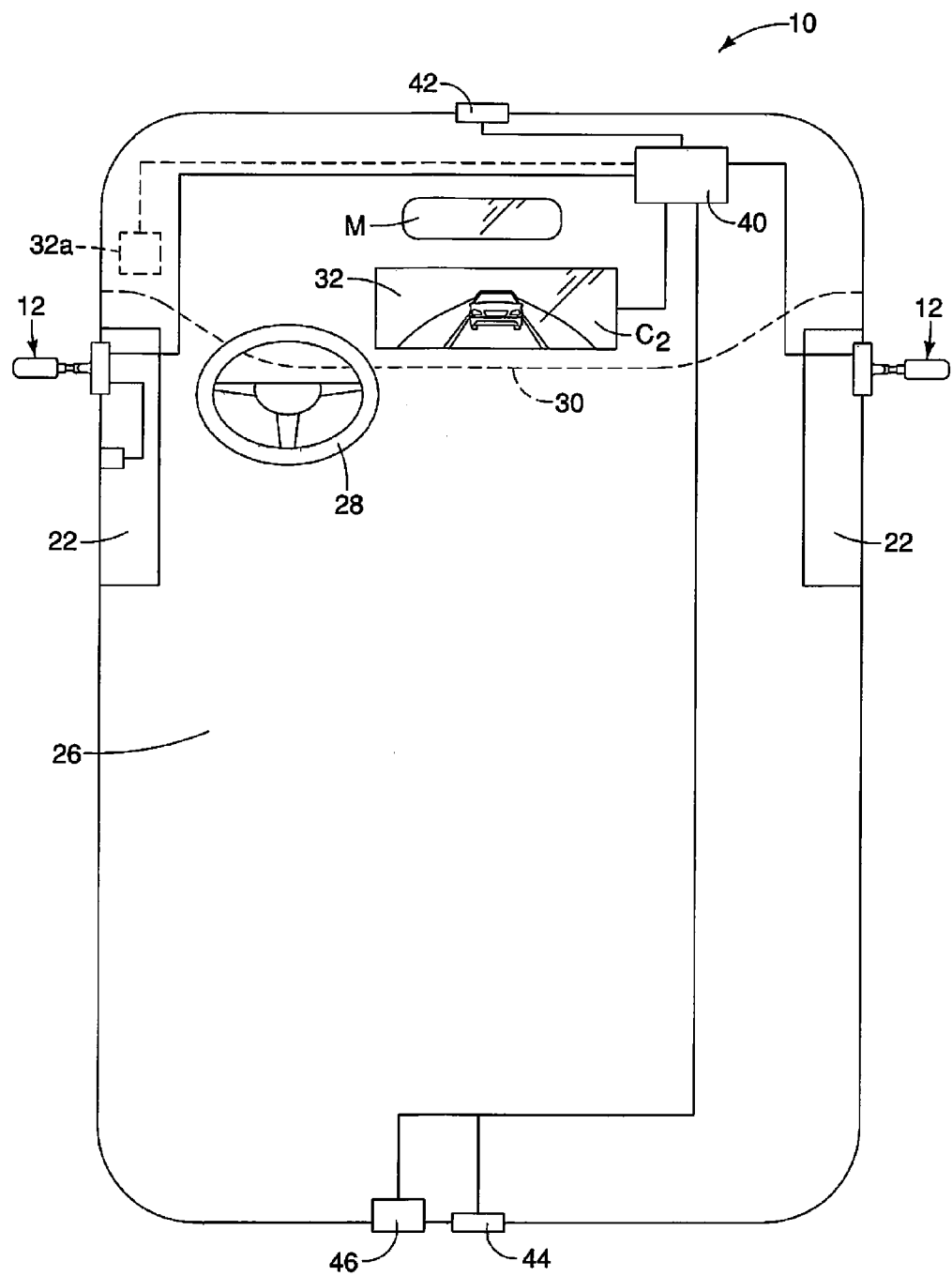
FIG. 3 is a schematic view of the vehicle showing a controller that is in electronic communication with a video display, a front camera, a rear camera, a trailer electrical connector and the video camera assemblies in accordance with the first embodiment.

As also shown in FIG. 3, the vehicle 10 also includes a controller 40, an optional front camera 42, an optional rear camera 44, an optional trailer electrical connector 46, a trailer hitch (not shown), the video display 32, the side video display 32a and the video camera assemblies 12.

The video display 32, the side video display 32a, the front camera 42, the rear camera 44, the trailer electrical connector 46 and the video camera assemblies 12 are in electronic communication and/or are electronically connected to the controller 40 and basically define a video system of the vehicle 10. For example, the video display 32, the front camera 42, the rear camera 44, the trailer electrical connector 46 and the video camera assemblies 12 can be directly wired in a conventional manner to the controller 40. Alternatively, some or all of the video display 32, the front camera 42, the rear camera 44, the trailer electrical connector 46 and the video camera assemblies 12 can be in communication with the controller 40 via a wireless communication system (not shown).

Figure 4:
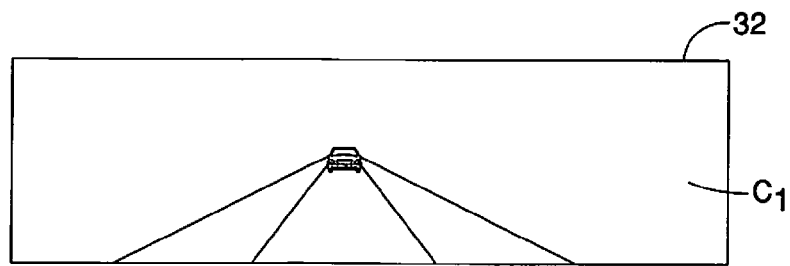
FIG. 4 is a plan view of the video display showing an image produced by the controller based upon captured images from at least one of the rear camera and the video camera assemblies with the controller operating in a rear view mode in accordance with the first embodiment.

The controller 40 of the video system can operate in a plurality of differing modes. For example, in a rear view mode, the controller 40 processes the images from combinations of one or more of the rear camera 44 and the video camera assemblies 12 to produce composite rear view images, such as the images $C_1$ and $C_2$ shown in FIGS. 3, 4 and 5. The images $C_1$ and $C_2$ show areas to the sides and rearward of the vehicle 10 on the video display 32, as represented schematically in FIGS. 3, 4 and 5. For example, as shown in FIG. 4, the image $C_2$ is a composite image that is produced by combining images from the video camera assemblies 12 with the images from the rear camera 44. Specifically, in FIG. 5 the section a of the image $C_2$ is from the video camera assembly 12 at the driver's side of the vehicle 10, the section b of the image $C_2$ is from the rear camera 44 behind the vehicle 10 and the section c of the image $C_2$ is from the video camera assembly at the driver's side of the vehicle 10. The controller 40 processes the captured images and processes them to provide the vehicle operator with a full rear view behind the vehicle 10.

Figure 5:
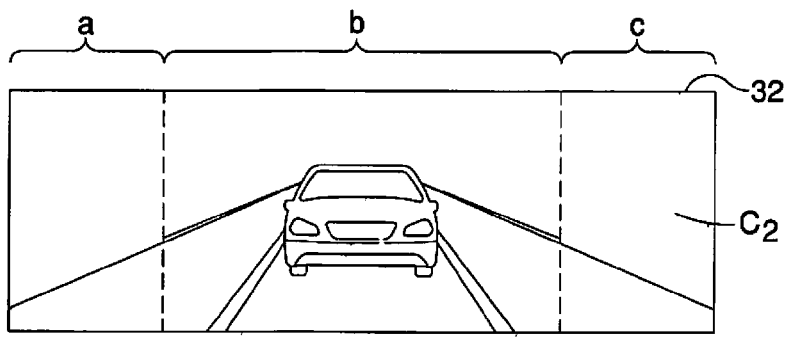
FIG. 5 is another plan view of the video display showing a composite image produced by the controller based upon captured images from the rear camera and the video camera assemblies with the controller operating in the rear view mode in accordance with the first embodiment.

The rear view mode as represented in FIGS. 3, 4 and 5 on the video display 32 is further described in greater detail in U.S. Pat. No. 8,144,033, issued Mar. 27, 2012, and assigned to Nissan Motor Co., Ltd. The disclosure of U.S. Pat. No. 8,144,033 is incorporated herein by reference in its entirety.

Basically, in the rear view mode, the cameras 12 are aimed to capture images rearward of their respective locations on the vehicle 10. The video images captured by the cameras 12 and the rear camera 44 (also aimed rearward) are processed by the controller 40 to produce a composite set of images displayed on the video display 32, such as the composite images $C_1$ and $C_2$ in FIGS. 3, 4 and 5. These composite images $C_1$ and $C_2$ provide the vehicle operator with visual information that can replace the visual information typically provided by conventional rear view mirrors. Consequently, rear view mirrors are not necessary in the vehicle 10. The controller 40 can be provided with a manual selector (not shown) that allows the vehicle operator to manually set the video mode to only show images captured by one or both of the video camera assemblies 12 or only the rear camera 44. The image shown in the video display 32 in FIGS. 3, 4 and 5 represents the composite image where images captured by the video camera assemblies 12 and the rear camera 44 (all aimed rearward) are electronically processed to provide a wide screen view of the areas behind the vehicle 10.

Further, the side video display 32a can be operated via the controller 40 to display images in a manner consistent with the video display 32. However, the side video display 32a is positioned adjacent the video camera 12 on the door 22, and between the door 22 and the vehicle operator. Although the side video display 32a is an optional feature, it is ideally positioned to provide a side rear view of the vehicle 10 displaying images captured by the adjacent video camera 12 in a manner consistent with images that would otherwise be provided by a rear view mirror which has been omitted and replaced with the video camera 12. In other words, vehicle operators are familiar with conventional side rear view mirrors and typically look to the side rear view mirror for visual information. The side video display 32a being next to the door 22 is positioned for the convenience of the vehicle operator. Thus, a standard mode of operation of the side video display 32a is one where only the images from the adjacent video camera assembly 12 are displayed thereon.

Figure 6:
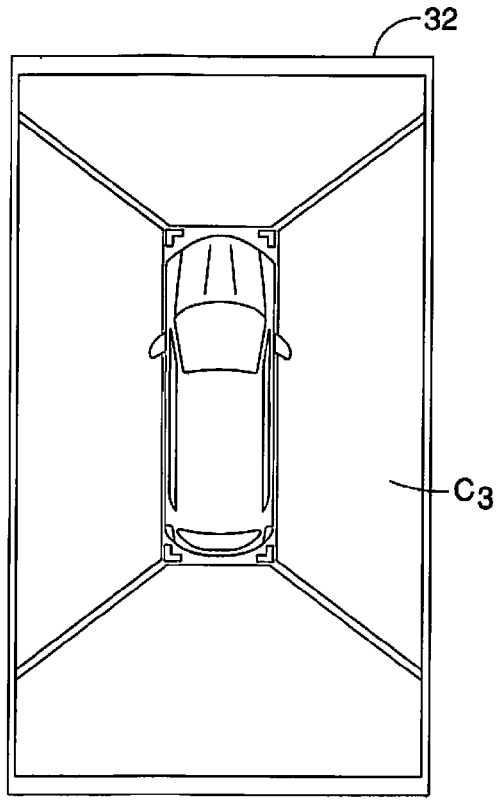
FIG. 6 is another plan view of the video display showing a composite image produced by the controller based upon captured images from the front camera, the rear camera and the video camera assemblies superimposed over a representation of the vehicle with the controller operating in a surround mode in accordance with the first embodiment.

The front camera 42 is typically fixed to the front of the vehicle 10 and is aimed to capture images of the area immediately in front of the vehicle. The rear camera 44 can be aimed to capture images of the areas immediately rearward of the vehicle 10 and/or to capture a downward angle to assist in parking. As is described in greater detail below, the video camera assemblies 12 can be aimed rearward or can be aimed to capture images of areas along-side the vehicle 10. Hence, the controller 40 can also operate in a surround mode or parking mode such that the images from the front camera 42, the rear camera 44 and the cameras 12 can be combined to provide a composite image on the video display 32 showing the areas surrounding the vehicle 10, as shown in FIG. 6. The vehicle operator of the vehicle 10 can observe the areas around the vehicle 10 captured by the plurality of cameras while parking or moving within a confined space by watching the video display 32.

The controller 40 of the video system provides the vehicle operator with an added level of perception while performing certain operations, such as backing up and parking. The controller 40 of the video system can include a feature in which the images captured by the plurality of cameras are superimposed over a still image of the vehicle 10 producing a composite image $C_3$ to orient the viewer, as shown in FIG. 6, in the surround mode (parking mode). When such a feature is employed, it is important that each of the plurality of cameras is in a fixed position relative to the vehicle 10 for accurate processing of the captured images. It should be understood that the video cameras 12 described herein below can be used with such a video system. Therefore the location of each of the cameras 12 when the controller 40 operates in the surround mode should be fixed relative to the vehicle 10, as described in greater detail below.

Video systems that operate in the surround mode (or parking mode) are known and therefore, further description is omitted for the sake of brevity. More detailed descriptions of various video systems that operate in the surround mode can be found in, for example, U.S. Patent Application Publication No. 2010/0238051, published Sep. 23, 2010 (application Ser. No. 12/680,423), U.S. Patent Application Publication No. 2012/0069182, published Mar. 22, 2012 (application Ser. No. 13/232,146), and U.S. Pat. No. 8,243,994, issued Aug. 14, 2012 (application Ser. No. 12/298,837) all commonly assigned to Nissan Motor Co. Ltd. The disclosures of U.S. Patent Application Publication No. 2010/0238051, U.S. Patent Application Publication No. 2012/0069182, and U.S. Pat. No. 8,243,994 are incorporated herein by reference in their entirety.

Figure 7:
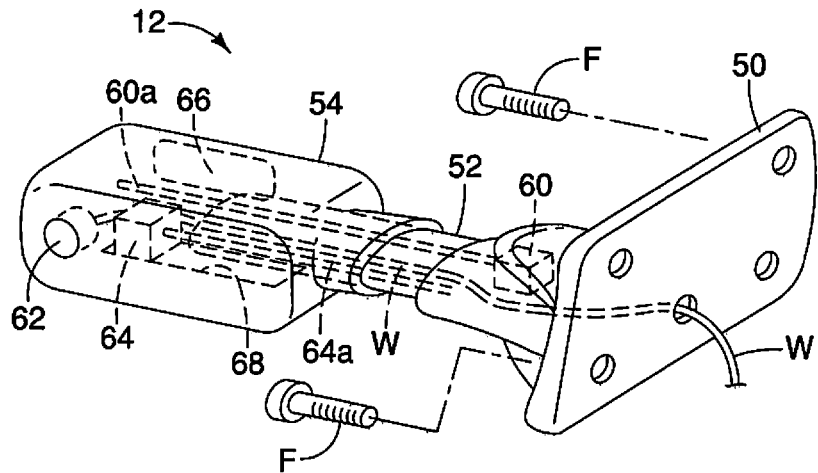
FIG. 7 is a perspective view of one of the video camera assemblies shown removed from the vehicle and in the retracted orientation in accordance with the first embodiment.
Figure 8:
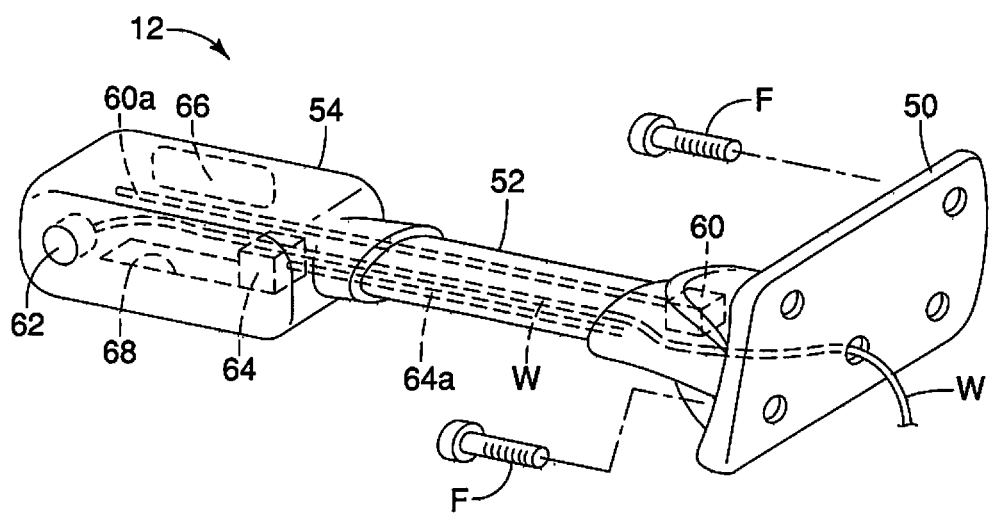
FIG. 8 is another perspective view of one of the video camera assemblies similar to FIG. 7, showing the video camera assembly in the extended orientation in accordance with the first embodiment.

A description of the video camera assemblies 12 is now provided with specific reference to FIGS. 7 and 8. As stated above, there is one video camera assembly 12 mounted to the passenger's side of the vehicle 10 and another video camera assembly 12 mounted to a driver's side of the vehicle 10. These two video camera assemblies 12 are identical to one another except that they can be symmetrically shaped with respect to one another to fit design criteria for each of the two sides of the vehicle 10. In other words, the video camera assemblies 12 can be mirror images of one another in blend in with the design features of the vehicle 10. Therefore, description of one video camera assembly 12 applies equally to both of the video camera assemblies 12.

As shown in FIGS. 7 and 8, the video camera assembly 12 basically includes a base 50, an extension portion 52 and an end portion or housing 54. The base 50 is configured to attach to the vehicle 10 by, for example, fasteners F shown in FIGS. 7 and 8. However, it should be understood from the drawings and the description herein that the base 50 can attach to the vehicle 10 via any of a variety of mechanical fasteners or fastening structures. For example, the base 50 can be molded and shaped to fit into a forward section of a window opening of the door 22. Further, in the drawings, the base 50 is shown attached to the door 22. Alternatively, the base 50 of the video camera assembly 12 can be fixed to the fender 20 or the roof structure 24 so long as the video camera assembly 12 is positioned to view areas along side and rearward of the vehicle 10. More specifically, the video camera assembly 12 is preferably fixed to a side facing surface of the vehicle 10, where the side facing surfaces are, for example, an exterior surface of the door 22, an exterior surface of the fender 20 or an exterior surface along the side of the roof structure 24.

The extension portion 52 is rigidly fixed (non-movably fixed) to the base 50 and is configured to support the housing 54 for movement along the extension portion 52. Specifically, in the depicted embodiment, the housing 54 is shaped and dimensioned to undergo telescoping movement along an outer surface of the extension portion 52. The extension portion 52 is hollow to accommodate transmission wires W extending therethrough and to accommodate an extension rod 60a of a movement mechanism 60 that effects the movement of the housing 54.

The movement mechanism 60 can be fixedly attached to an inner portion of the base 50 or can be fixedly attached to an inner surface of the hollow interior of the extension portion 52. The extension rod 60a is fixed at one end to an inner surface of the housing 54. A free end of the extension rod 60a extends through the movement mechanism 60. The extension rod 60a can include gear teeth (not shown) that are engaged by mating gear teeth within the movement mechanism 60, as described further below.

The housing 54 includes a first video camera 62, a second video camera 64 and a turn signal indicator 66. In the depicted embodiment, the first video camera 62 is rigidly fixed to the housing 54 for movement therewith. Specifically, the first video camera 62 is fixed within the housing 54 near a distal end of the housing 54. The housing 54 includes an opening that exposes a lens portion of the first video camera 62. The first video camera 62 is positioned relative to the housing 54 and the base 50 such that with the base 50 fixed to a side surface of the vehicle 10, such as one of the doors 22, the first video camera 62 is aimed in a direction such that the first video camera 62 captures images of the areas to the side of the vehicle 10 and to the rear of the vehicle 10 in a manner consistent with the usage of a conventional side rear view mirror.

Since the housing 54 is movable along the length of the extension portion 52, the first video camera 62 is correspondingly moveably supported to the base member 50 for linear movement. Specifically, the first video camera 62 and the housing 54 are movable between a retracted orientation (FIGS. 1 and 7) adjacent to the side facing surface of the vehicle 10 and an extended orientation (FIGS. 2 and 8) where the first video camera 62 is moved outward away from the side facing surface of the vehicle 10 to capture video images of the area alongside and rearward of the vehicle 10. The controller 40, which includes an image processor, is operatively coupled to the first video camera 62 and processes the images from the first video camera 62. The processed images are then displayed on the video display 32. Specifically, the controller 40 processes the video images captured by the first video camera 62 and streams the video images to the video display 32 in real time.

The movement mechanism 60 of the video camera assembly 12 can be any of a variety of positioning mechanisms operably attached to the base 50 and the housing 54. In the depicted embodiment, the movement mechanism 60 can include an electric motor with gears (not shown) that engage the extension rod 60a in order to position the housing 54. Alternatively, the movement mechanism 60 can be a positioning mechanism such as a track and tape mechanism similar to a conventional window regulator assembly, a hydraulic piston arrangement, a stepper motor and linear gear arrangement or a manually operated push/pull rod mechanism. The movement mechanism 60 can be electronically connected to the controller 40 such that the controller 40 automatically controls the positioning of the housing 54 or the movement mechanism 60 can be a manually operated device such that the vehicle operator can manually control the movement and positioning of the housing 54 between the retracted orientation (FIGS. 1 and 7) and the extended orientation (FIGS. 2 and 8). The movement mechanism 60 can be remotely operated via a control panel on the instrument panel 30. The vehicle operator can interact with the control panel to position the housing 54 or the movement mechanism 60 can be connected to the controller 40 for automatic positioning of the housing 54 and the first video camera 62. As is described in greater detail below in an alternative embodiment, the movement mechanism 60 can be automatically controlled in response to predetermined driving conditions, such as the presence of a trailer being towed by the vehicle 10. Since movement mechanisms 60 such the various positioning mechanisms mentioned above are conventional mechanisms, further description is omitted for the sake of brevity.

The second video camera 64 is disposed within the housing 54 but is movable relative to the housing 54. More specifically, the second video camera 64 is mounted on a rod 64a that is non-movably fixed to an end of the extension portion 52 or to the base 50. Consequently, the second video camera 64 remains in a fixed position relative to the base 50 and the extension portion 52. The housing 54 is provided with a slot 68 open to a lower surface of the housing 54. The lens of the second video camera 64 is aligned with the slot 68 such that as the housing 54 is moved between the extended orientation and the retracted orientation, the lens of the second video camera 64 remains optically exposed. The second video camera 64 is aimed at the ground to the side of the vehicle 10. Images from the second video camera 64 are fed to the controller 40 for use in the surround mode (parking mode) described above. Since the first video camera 62 is aimed rearward and the second video camera 64 is aimed downward, the second video camera 64 is aimed in a direction that is perpendicular to the direction of the first video camera 62.

The turn signal indicator 66 is an optional feature that is installed to a front surface of the housing 54, as indicated in FIG. 2. The turn signal indicator 66 is a convenience that provides greater display of the vehicle operator's turning intensions. Since turn signal indicators are otherwise conventional features, further description is omitted for the sake of brevity.

The video camera assemblies 12 when used with the controller 40 and the video display 32 basically replace conventional side rear view mirrors. The benefit of this arrangement is lowered wind resistance due to the removal of large side rear view mirrors and replacement with small video camera assemblies 12. For a large vehicle, such as a pick-up truck that can tow a trailer, the improved aerodynamics of the vehicle are measureable. Typically, a large pickup truck requires large side rear view mirrors that can increase the overall wind resistance of the vehicle dramatically. When viewed from the front of the vehicle, one large side rear view mirror can have as much as a full square foot of visible area, adding to the overall drag of the vehicle in a measurable manner. Therefore, replacement of the large side rear view mirrors with the small profile of the video camera assemblies 12 can have a noticeable reduction in the drag of the vehicle.

Second Embodiment

Figure 9:
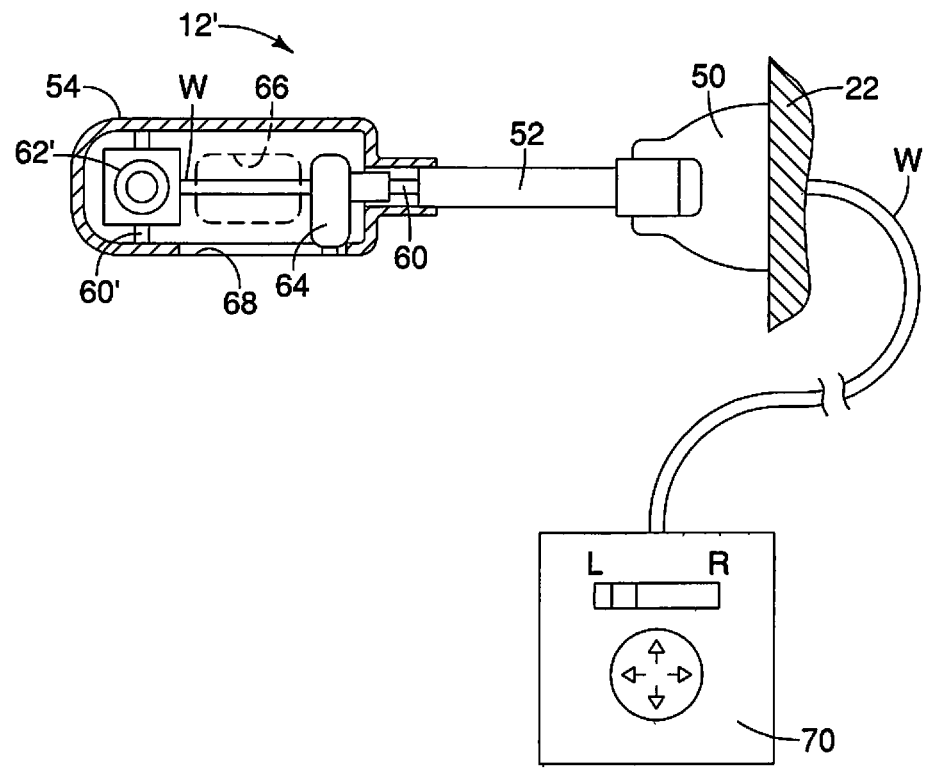
FIG. 9 is a rear sectional view of a video camera assembly in an extended orientation showing a video camera with a multi-dimensional aiming and positioning features in accordance with a second embodiment.
Figure 10:
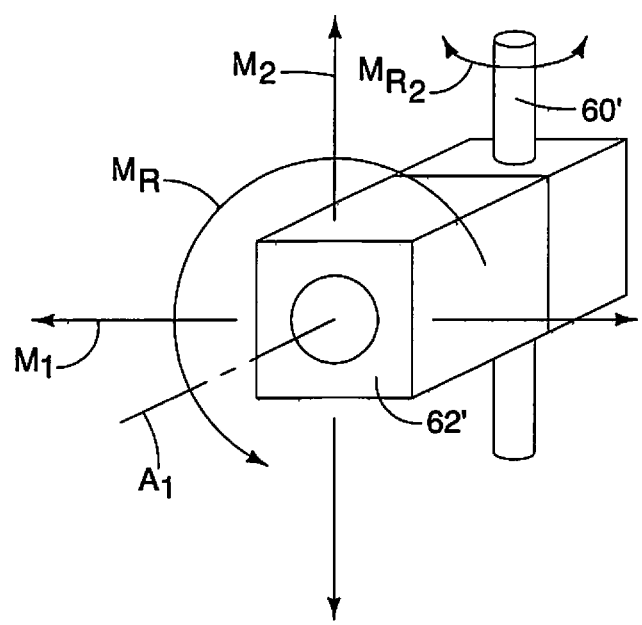
FIG. 10 is a schematic view of the video camera shown removed from the video camera assembly depicted in FIG. 9 showing details of the multi-dimensional aiming features of the video camera in accordance with the second embodiment.

Referring now to FIGS. 9 and 10, a video camera assembly 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the video camera assembly 12' includes many of the features of the video camera assembly 12 of the first embodiment, such as the base 50, the extension portion 52, the housing 54, the second camera 64 and the slot 68 of the housing 54. However, in the second embodiment the first video camera 62 is replaced with a first video camera 62', shown schematically in FIG. 10.

The first video camera 62' is movable with the housing 54 between the retracted orientation shown in FIGS. 1 and 7 and the extended orientation shown in FIGS. 2 and 8, and explained above with respect to the first embodiment. The movement of the housing 54, as described above, is represented in FIG. 10 by the movement arrow $M_1$. However, the first video camera 62' is provided with additional features that can be utilized by a vehicle operator using a control panel 70 shown in FIG. 9.

Specifically, the first video camera 62' can be positioned or aimed to fine tune the video images captured by the first video camera 62'. As shown in FIG. 10, internal aiming mechanisms within the housing of the first video camera 62' can also move the first video camera 62' up and down along the shaft 60' as represented by the movement arrow $M_2$. Further, the first video camera 62' can be rotated about an axis $A_1$ as represented by the movement arrow $M_{R1}$. Still further, the first video camera 62' can be pivoted about the shaft 60' as represented by the movement arrow $M_{R2}$ in FIG. 10. The first video camera 62' can be modified to include pairs of the movements or only selected ones of the movements represented by the movement arrow $M_2$, the movement arrow $M_{R1}$ and/or the movement arrow $M_{R2}$.

The housing of the first video camera 62' can be provided with a positioning mechanism (not shown) that includes plurality of small stepper motors (not shown) that effect the small position adjustments that make each of the above described movements possible. Since such stepper motors and similar fine positioning mechanisms are conventional components, further description is omitted for the sake of brevity.

Consequently, in the second embodiment, the first video camera 62' can be aimed in a manner similar to that of a side rear view mirror to tailor the captured images to the needs of the vehicle operator. More specifically, the position adjusting mechanism of the first video camera 62' can be used to selectively aim the first video camera 62' to capture video images in a plurality of directions.

In the second embodiment, the second video camera 64 can be as described above with respect to the first embodiment, or alternatively, can be fixed to the housing 54 for movement therewith. More specifically the second video camera 64 is aimed downward to capture images of the area alongside the vehicle 10.

Third Embodiment

Figure 11:
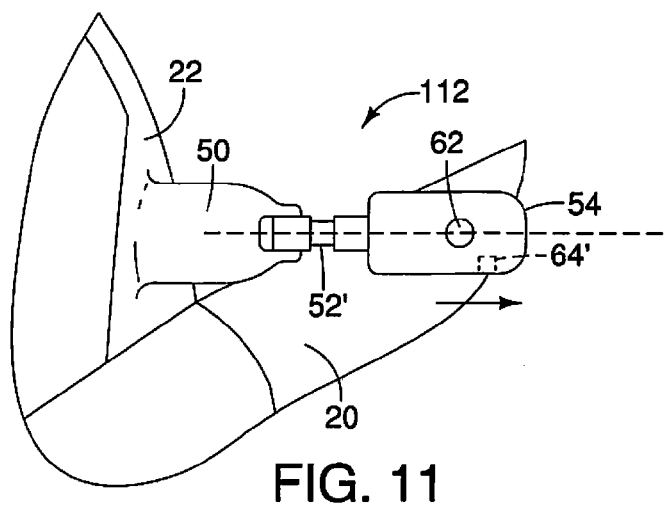
FIG. 11 is a perspective view of a video camera assembly in a retracted orientation in accordance with a third embodiment.
Figure 12:
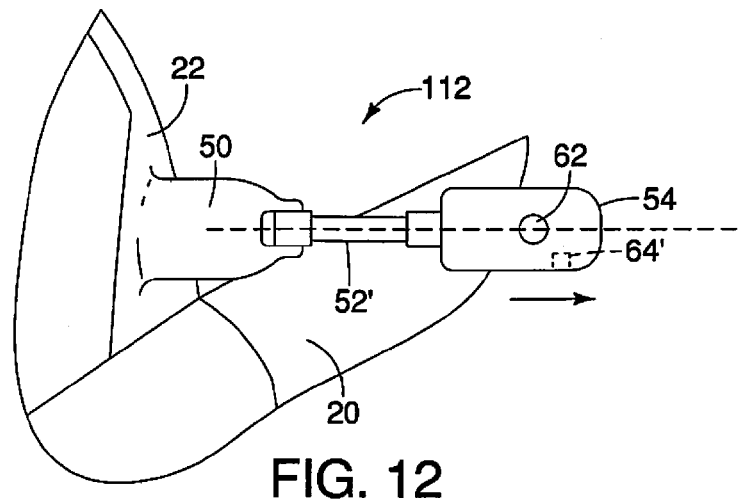
FIG. 12 is another perspective view of the video camera assembly shown in FIG. 11, showing the video camera assembly in a first extended orientation in accordance with the third embodiment.
Figure 13:
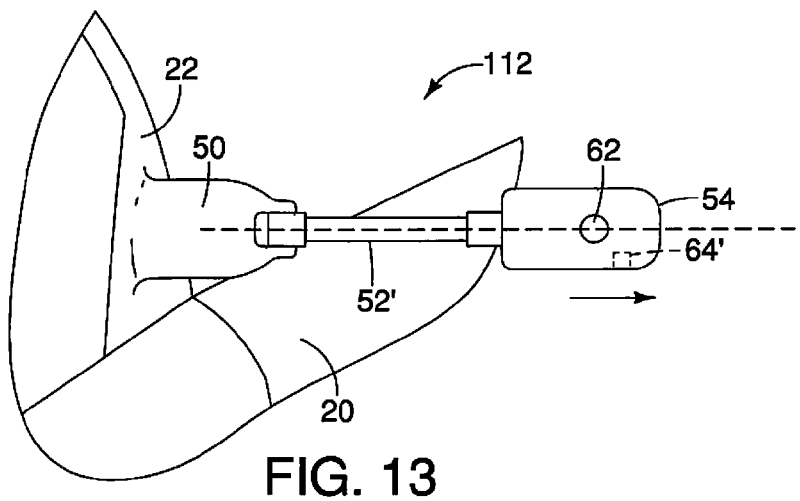
FIG. 13 is another perspective view of the video camera assembly shown in FIGS. 11 and 12, showing the video camera assembly in a second extended orientation in accordance with the third embodiment.

Referring now to FIGS. 11, 12 and 13, a video camera assembly 112 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a single prime (')

The video camera assembly 112 includes the base 50 and the housing 54 as described above with respect to the first embodiment, but is modified with an extension portion 52' that is longer than the extension portion 52 of the first embodiment. The housing 54 includes the first video camera 62 and a second video camera 64' that is fixed to the housing 54 for movement therewith. Alternatively the second video camera 64' can be replaced with the second video camera 64 as described above with respect to the first embodiment.

In the third embodiment, the housing 54 can be positioned by the controller 40 to a plurality of differing positions. For example, FIG. 11 shows the housing 54 in the retracted orientation. FIG. 12 shows the housing 54 in a first extended orientation. FIG. 13 shows the housing 54 in a second extended orientation where the housing 54 is positioned further laterally outward away from the side of the vehicle 10.

In the third embodiment, the controller 40 can process a plurality of differing signals, such as manually inputted signals and automatic signals. For example, if the vehicle operator wishes to manually position the housing 54 and the first video camera 62 to either the first extended orientation or the second extended orientation, the vehicle operator can operate a control panel (connected to the controller 40) on the instrument panel 30 of the vehicle 10. Thus, the first video camera 62 can be positioned at three differing orientations, the retracted orientation, the first extended orientation and the second extended orientation.

Further, the controller 40 can automatically position the housing 54 and the first video camera 62 in response to detecting that the vehicle 10 is being operated. Specifically, the controller 40 can be connected to the engine (not shown) of the vehicle 10, detect whether or not the engine is operating, and automatically position the housing 54 to either the first extended orientation or the second extended orientation. Upon detection that the engine is not operating the controller 40 is configured to automatically retract the housing 54 to the retracted orientation.

Further, as shown in FIG. 3, the vehicle 10 includes a trailer electrical connector 46 that is configured to receive a mating trailer connector that connects brakes, brake light operation and turn signal operation of the trailer to the brake, brake light operation and turn signal operation of the vehicle 10 in a conventional manner. The trailer electrical connector 46 is further connected to the controller 40 such that in response to detecting the connection to a trailer being towed by the vehicle 10, the controller 40 can automatically position the housing 54 accordingly.

For example, the controller 40 is configured to detect the type of trailer attached to the vehicle 10. Specifically, the trailer (not shown) can include its own controller with identification information that provides the controller 40 with information about the trailer. If the controller 40 detects that the trailer attached to the vehicle 10 is a small trailer, the controller 40 automatically positions the housing 54 and the first video camera 62 to the first extended orientation shown in FIG. 12. Further, if the controller 40 detects that the trailer attached to the vehicle 10 is a large trailer, the controller 40 automatically positions the housing 54 and the first video camera 62 to the second extended orientation shown in FIG. 13 in order to provide a greater field of vision to the sides of the trailer.

Consequently, the controller 40 is configured to automatically move the first video camera 62 in response detection that the trailer electrical connector 46 is in use.

Fourth Embodiment

Figure 14:
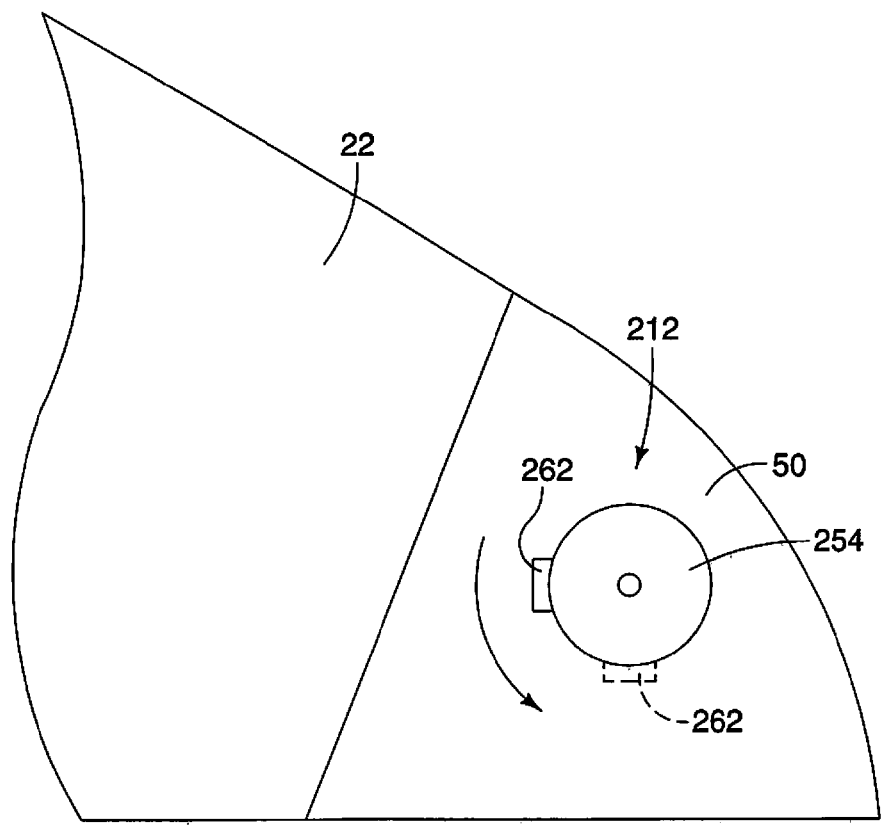
FIG. 14 is an end view of a video camera assembly that includes a single video camera that is rotatable between a first orientation with the video camera aimed in a rearward direction relative to the vehicle and a second orientation with the video camera aimed in a downward direction relative to the vehicle in accordance with a fourth embodiment.
Figure 15:
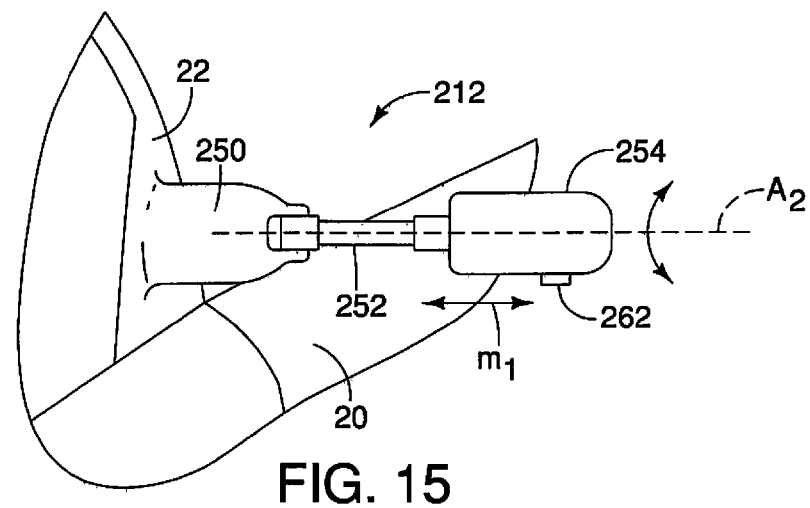
FIG. 15 is a perspective view of the video camera assembly depicted in FIG. 14 showing the single video camera rotatable between the first orientation and the second orientation in accordance with the fourth embodiment.

Referring now to FIGS. 14 and 15, a video camera assembly 212 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the video camera assembly 212 includes a base 250, an extension 252 and a housing 254. The video camera assembly 212 is attached to the door 22 of the vehicle 10, but can alternatively be attached to the fender 20 or the roof structure 24 (not shown in FIGS. 14 and 15).

As with the first embodiment, the housing 254 is movable along the extension 252 in the direction indicated by the movement arrow $M_1$ between a retracted orientation and an extended orientation as described above with respect to the first embodiment. The movement in the direction represented by the movement arrow $M_1$ is essentially movement along an axis $A_2$. The axis $A_2$ extends laterally outward away from the door 22 and the vehicle 10.

However, in the fourth embodiment, the housing 254 of the video camera assembly 212 includes only a single video camera 262. Further, in the fourth embodiment, the housing 254 is attached to the extension 252 for movement along the axis $A_2$ and also pivoting movement about the axis $A_2$. The housing 254 includes a further positioning mechanism (not shown) that pivots the housing 254 relative to the extension 252 about the axis $A_2$ from a rearward viewing orientation shown in solid lines in FIG. 14 to a downward viewing orientation shown in phantom lines in FIG. 14 and shown in solid lines in FIG. 15.

Consequently, the video camera 262 is supported to the base 250 for movement along the axis $A_2$ and is rotatable about the axis $A_2$. Therefore, in the fourth embodiment, both of the above described modes of operation effected by the controller 40 (the rear view mode and the surround mode) can be provided with the video camera assembly 212 having only a single video camera 262.

Fifth Embodiment

Referring now to FIGS. 16-19, a video camera assembly 312 installed to the vehicle 10 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the vehicle 10 has a fender 320 that is configured to support the video camera assembly 312. The fender 320 has an inboard surface 320a and an outboard surface 320b. The video camera assembly 312 basically includes a base 350, an extension 352, a movement mechanism 360 and a video camera 362. The base 350 is fixedly attached to the inboard surface 320a (a hidden surface) of the fender 320. The video camera 362 is fixed to the extension 352 adjacent a distal end 352a thereof. The extension 352 is movable relative to the base 350 via the movement mechanism 360 such that the video camera 362 can be positioned in a retracted orientation shown in FIGS. 16 and 18 or can be positioned in an extended orientation shown in FIGS. 17 and 19.

The movement mechanism 360 can be an electric motor with gears that engage corresponding gears (not shown) on an outer surface of the extension 352 or can be any of a variety of conventional positioning mechanisms that position extensible or telescopic parts.

In the retracted orientation shown in FIGS. 16 and 18, the distal end 352a of the extension 352 is flush with the outboard surface 320b of the fender 320. As described above in the first embodiment, the movement mechanism 360 can be electrically connected to the controller 40 such that the controller 40 can automatically retract the video camera 362 to the retracted orientation when the vehicle 10 is not in use and can extend the video camera 362 to the extended orientation when the vehicle 10 is being operated.

The arrangement of the video camera assembly 312 of the fifth embodiment basically hides the video camera assembly 312 when not in use and automatically positions the video camera assembly 312 for usage in response to the engine (not shown) of the vehicle 10 being started.

The controller 40 preferably includes a microcomputer with a video camera processing and video camera positioning control program that controls the positioning mechanisms and the cameras of the various embodiments, as discussed below. The controller 40 can also include other conventional components such as an input interface circuit, an output interface circuit, and storage devices such as a ROM (Read Only Memory) device and a RAM (Random Access Memory) device. The microcomputer of the controller 40 is programmed to control the positioning mechanisms, the video cameras and the video display described above. The memory circuit stores processing results and control programs such as ones for video signal processing and operation that are run by the processor circuit. The controller 40 is operatively coupled to the video camera assemblies and video display of the various embodiments above in a conventional manner. It will be apparent to those skilled in the art from this disclosure that the precise structure and algorithms for the controller 40 can be any combination of hardware and software that will carry out the functions of the present invention.

There are various elements of the vehicle 10 and the video camera assemblies 12, such as positioning mechanisms that are conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the video camera assembly. Accordingly, these terms, as utilized to describe the present invention should be interpreted relative to a vehicle equipped with the video camera assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle comprising:
    a vehicle body structure defining a side facing surface outside the vehicle body structure extending from adjacent a front end of the vehicle to adjacent a rear end of the vehicle, an inner facing surface, opposite to the side facing surface, extending from adjacent the front end to adjacent the rear end and a passenger compartment within the vehicle body structure;
    a base member fixedly mounted to the inner facing surface;
    a video camera moveably supported to the base member for linear movement between a retracted orientation adjacent to the side facing surface and an extended orientation extended outward away from the side facing surface to capture a video image of an area outside the vehicle body structure, the video camera being flush with the side facing surface when in the retracted orientation;
    a video display supported to the vehicle body structure such that the video display is visible within the passenger compartment; and
    an image processor operatively coupled to the video camera and the video display to process the video image captured by the video camera and to stream a video view to the video display.

2. The vehicle in accordance with claim 1, wherein
the video camera includes a position adjusting mechanism configured to automatically move the vehicle camera to the extended orientation in response detection that the vehicle is being operated.

3. A vehicle camera assembly, comprising
a base member configured to attach to a vehicle body structure;
a housing movably coupled to the base member for linear movement between a retracted orientation adjacent to the base member and an extended orientation extended outward away from the base member;
a video camera mounted to the housing for movement therewith to capture a video image;
a mechanical movement structure connected to the base member and the video camera configured to move the video camera between the retracted orientation and the extended orientation; and
a second camera fixed to the housing for movement therewith, the video camera being aimed in a first direction, and the second camera being aimed in a second direction perpendicular to the first direction.

4. The vehicle in accordance with claim 3, further comprising:
a vehicle body structure defining a side facing surface outside the vehicle body structure and a passenger compartment within the vehicle body structure, the base member being fixedly mounted to the side facing surface;
a video display supported to the vehicle body structure such that the video display is visible within the passenger compartment; and
an image processor operatively coupled to the video camera and the video display to process the video image captured by the video camera and to stream a video view to the video display.

5. The vehicle in accordance with claim 1, wherein
the video camera is configured to undergo telescoping movement with respect to the base member.

6. The vehicle in accordance with claim 3, wherein
the video camera is aimed to capture video images in a rearward direction relative to the vehicle body structure.

7. A vehicle camera assembly comprising
a base member configured to attach to a vehicle body structure;
a housing movably coupled to the base member for linear movement between a retracted orientation adjacent to the base member and an extended orientation extended outward away from the base member;
a video camera mounted to the housing for movement therewith to capture a video image; and
a mechanical movement structure connected to the base member and the video camera configured to move the video camera between the retracted orientation and the extended orientation; and
a second camera non-movably fixed to the base member, the video camera being aimed in a first direction, and the second camera being aimed in a second direction perpendicular to the first direction.

8. The vehicle in accordance with claim 7, further comprising
a towing connector, and
the video camera includes a position adjusting mechanism configured to automatically move the vehicle camera to the extended orientation in response detection that the towing connector is in use.

9. The vehicle in accordance with claim 7 wherein
the second camera is aimed in a downward direction relative to the vehicle body structure.

10. The vehicle in accordance with claim 9, further comprising
the video camera is aimed in a rearward direction relative to the vehicle body structure.

11. The vehicle in accordance with claim 9, wherein
the housing having a hollow interior and a slot along a lower surface thereof that is open to the hollow interior, and
the second video camera is located within the hollow interior of the housing such that a lens of the second video camera aligns with the slot.

12. The vehicle in accordance with claim 7, further comprising
a turn signal lamp fixed to the housing and being movable therewith.

13. The vehicle in accordance with claim 7, wherein
the first direction is a rearward direction and the second direction is a downward direction.

* * * * *